United States Patent [19]

Lewis

[11] 3,821,263
[45] June 28, 1974

[54] FLAME RETARDANT HALOGEN AND PHOSPHORUS CONTAINING POLYOLS
[75] Inventor: Morton Lewis, Elmhurst, Ill.
[73] Assignee: Swift & Company, Chicago, Ill.
[22] Filed: Sept. 27, 1972
[21] Appl. No.: 292,742

[52] U.S. Cl.............................. 260/403, 252/49.9
[51] Int. Cl............................ C07f 9/02, A23j 7/00
[58] Field of Search.................................... 260/403

[56] References Cited
UNITED STATES PATENTS
3,534,073   10/1970   Lewis................................. 260/403
3,542,820   11/1970   Rakhit............................... 260/403
3,682,988   8/1972    Lewis................................. 260/403

Primary Examiner—Elbert L. Roberts
Attorney, Agent, or Firm—Edward T. McCabe; Charles E. Bouton; Jay C. Langston

[57] ABSTRACT

Phosphonated high molecular weight polyol esters and polyol ethers are prepared by reacting a halogen-containing high molecular weight hydroxy-containing polyether, polyester or polyether polyester with an alkali metal salt of a dialiphatic or a diaryl acid phosphite. The invention provides a means for introducing a carbon-phosphorus covalent bond into the molecule of a high molecular weight polyol without destroying the hydroxyl functionality.

17 Claims, No Drawings

FLAME RETARDANT HALOGEN AND PHOSPHORUS CONTAINING POLYOLS

This invention relates to new compositions of matter and more specifically to the production of high molecular weight polyols having phosphonate groups and halogen groups on the same molecule. By controlling the amount of reactants, it is possible to replace all or some of the halogen in the molecule. The totally phosphonated compositions have utility as extreme pressure lubricants. For flame-retardant applications it is desirable to have both elements of halogen and phosphorus present in the same molecule.

It has previously been proposed to prepare polyurethane foams by reacting a polyhydroxy compound such as a hydroxy containing polyester, a polyoxyalkylene glycol or similar polyols with organic polyisocyanates in a reaction mass containing a foaming agent. Polyurethane foams produced in this conventional manner have some degree of flame resistance but it has been necessary in the past to produce a foam that possesses a much higher degree of flame resistance for use in a number of systems.

Certain flame retardant materials used in urethane technology are not chemically bonded in the urethane polymer and are slowly lost on aging of the foam by volatilization, leaching and migration. In addition, the use of flame-proofing additives may upset the surface chemistry of the foaming system and lead to severe destruction of internal cell structures, formation of a coarse cell structure and/or collapse of the foam during manufacturing. The difficulty in successful flameproofing urethane foams, as opposed to bulk materials, is further complicated by the troublesome problems of proper additive distribution at gas-solid interfacial surfaces due to the inherent physical movement of the composition during the foaming operation.

At the present time, there are many different compounds being used to impart flame retardants in urethanes. However, the compounds fall generally into one of two basic classes. When used in urethane systems they may be classified as either reactive or nonreactive in reference to the isocyanate component of the system. The reactive type of flame retardant additive can be combined chemically with the foam and will not evaporate from the surface or leach out when the foam is completely cured. However, not all the active compounds can be used to produce a suitable particular type of foam. Further, some compounds have too high a cross-linking density and their use is limited to the rigid urethane foam systems.

Incorporation of flame retardant materials in the urethane foams by chemically bonding the additives into the polymer network offers advantages over foams containing nonreactive, additive flame retardants. In this connection, it has been proposed to use halogenated caster oil, namely brominated or chlorinated castor oil, as a reactive flame retardant. These halogenated castor oils produce flame-resistant polyurethane foams but possess the disadvantage of being chemically unstable, if they are not in their prepolymer form, at ambient or higher temperatures.

Use of these halogenated oils in polyurethane foam preparations is then limited since the physical properties of the compound that are important for imparting the desired properties into the foam, especially viscosity, hydroxyl number, acid number and color, change substantially on aging at ambient temperatures. For example, brominated castor oil per se undergoes a decrease of hydroxyl number and a parallel increase in acid number during aging. The use of halogenated castor oils as reactive flame-retardant polyols in polyurethane foams suffers from the disadvantage of having physical properties constantly changing on aging.

Polymer additives, whether they are reactive or not, that contain halogen and especially bromine impart some flame resistance to plastic materials. However, when phosphorus is incorporated into the same molecule that contains the halogen, the flame resistance is greatly enhanced. The phosphorus should be incorporated in such a manner that it will not be hydrolyzed, leached, weathered or otherwise subject to conditions that could cause it to separate from the molecule. The best way this can be accomplished is by forming a carbon-phosphorus covalent bond. The typical carbon-oxygen-phosphorus ester linkage is hydrolytically unstable and could break down over time.

One acceptable method for incorporating phosphorus into bromine containing materials is to react a trialkyl phosphite with the bromine containing materials. The phosphorus replaces the bromine by a reaction known as the Arbusov reaction. If the amount of trialkyl phosphite is controlled so that all the bromine is not replaced, the result is a molecule containing both phosphorus and bromine. To make this reaction go, however, for all but the most reactive alkyl halides, it is necessary to heat the reaction media often to temperatures in excess of 100°C. Certain halogenated structures cannot tolerate the reaction conditions and decompose in one way or another during the Arbusov reaction. Usually when these temperature sensitive compounds are polyols, the result of the decomposition is a loss of hydroxyl functionality. This is very serious since it is the hydroxyl groups which react with isocyanates to make urethane bonds. If the hydroxyl functionality is lost or drastically reduced, the product, even with bromine and phosphorus in it, is useless in a urethane system and indeed its incorporation will usually be detrimental to the system.

It is one object of this invention to prepare novel compositions of matter containing halogen and phosphonate groups for use in urethane systems.

It is also an object of this invention to provide a new method for the incorporation of phosphorus into sensitive halogenated polyols without substantially reducing the hydroxyl functionality of the composition.

Additional objects, if not specifically set forth herein, will be readily apparent to those skilled in the art from the detailed description of the invention which follows:

In general, the compositions of this invention comprise derivatives of halogenated polyesters of monobasic or polybasic acids with polyhydric alcohols, polyethers formed by the reaction of polyhydric alcohols and haloepoxyalkanes as well as polyester polyethers wherein either the alcohol or acyl moieties contain one or more phosphonate groups and one or more halogen groups. The products are usually formed by reacting an alkali metal salt (lithium, sodium or potassium) of a dialkyl phosphite with a halogenated polyol. In carrying out the process, it is possible to remove all of the halogen in the halogenated oil by adding an equivalent amount of salt of dialkyl phosphite for all the halides and thus synthesize a completely phosphonated oil. In those instances where halogen is desirable, i.e., in flame-proofing compositions, the totally phosphonated oil lies outside the scope of this class of compounds.

More specifically, the method of this invention comprises reacting a dialiphatic or diaromatic acid phosphite with sodium, lithium or potassium in an inert solvent, such as tetrahydrofuran, 1,3-Dioxane or Dioxane. Hydrogen is evolved and the product is the alkali metal salt of the dialiphatic or diaromatic phosphite. In most cases, the salt is not isolated but is used directly in solution by adding it to a solution of a halogen and hydroxy-containing polyol. There is an immediate exothermic reaction and the reaction mass increases in temperature a few degrees while a precipitate forms. After about 2 to 3 hours the solution is removed from the precipitate by filtration or centrifugation and the solvent is removed by distillation under reduced pressure. The solid precipitate is made up of sodium bromide (assuming the phosphite salt was the sodium salt and the halogenated polyol was a brominated polyol) and some unreacted phosphite salt. The brominated polyol product now has less bromine, but in its place phosphorus has been incorporated. There is a slight reduction in the hydroxyl value of the product but it is not as extensive as found when the Arbusov reaction is used to attempt to get phosphorus into brominated castor oil. Generally, the final product will contain 1-15 percent phosphorus and 1-75 percent halogen, by weight.

The following reaction sequence depicts what is believed to be the reactions taking place:

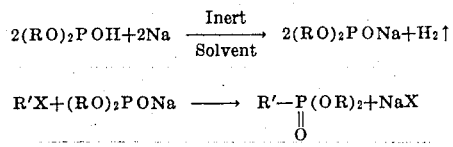

In the formula R' is a polyester polyol, a polyether polyol or a polyester polyether polyol. Highly desirable reactants that can be used may be represented by the formula $(RO)_2POH$ wherein R is an aromatic radical of six to 20 carbons or a straight or branch chain alkyl, alkenyl or alkynyl, radical of one to 20 carbons, preferably one to eight carbon atoms. Examples include dimethyl acid phosphite, diethyl acid phosphite, dipropyl acid phosphite, diisopropyl acid phosphite, dibutyl acid phosphite, diisobutyl acid phosphite, diamyl acid phosphite, dihexyl acid phosphite, di(2-ethylhexyl) acid phosphite, diheptyl acid phosphite, dioctyl acid phosphite, didodecyl acid phosphite, dioctadecyl acid phosphite, dioleyl acid phosphite, etc. Mixed acid phosphites such as ethyl methyl acid phosphite, ethyl butyl phosphite, and propyldidodecyl acid phosphite, etc., may be used. Also of importance are the unsaturated phosphites such as diallyl acid phosphite, inasmuch as these compounds provide multiple reactive sites for subsequent halogenation or polymerization after reaction with the halogen containing polyol. Other unsaturated phosphites include dicinnamyl acid phosphite, dimethallyl phosphite, divinyl acid phosphite, di-2-butenyl acid phosphite.

In the above identified reactions, the compound R'X stands for a complex halogenated polyester or polyether polyol. The entering phosphonate groups displace one or more halogens from the molecule and the phosphorus atom attaches to the carbon atom that was bonded to the halogen. If there are multiple halogens in a molecule, they can be replaced by varying the amount of alkali metal salt used.

In the preparation of the halogen-containing polyester polyols one may utilize the reaction product of monobasic acids (six to 30 carbons) or polybasic acids, usually of two to 40 carbons, with monomeric polyhydric alcohols. The polyhydric alcohol contains two to six hydroxyl groups and two to 20 carbons, usually two to six carbons when aliphatic, and may be saturated or unsaturated and substituted with non-interfering groups. The preferred polyhydric alcohols are glycerol, glycols, pentaerythritol as well as their halogen-containing derivatives. In this connection, the halogen-containing polyester polyol may contain halogen on the acyl portion, the alcohol portion or on both portions of the ester molecule. Further, the hydroxyl function may be present on the acyl chain, the alcohol portion or both.

Examples of suitable polyhydric alcohols include ethylene glycol, porpylene glycol, 1,4-butanediol, diethylene glycol, dipropylene glycol, neopentyl glycol, triethylene glycol, hexamethylene glycol, hexanetriol, butanetriol, trimethylol propane, polyglycerol, dipentaerythritol, polypentaerythritol, 2,2 bis(bromomethyl) 1,-3-propanediol, erythritol, mannitol, sorbitol, 2-butene-1,4-diol, 2-butyne-1,4-diol, p,p'-isopropylidenediphenol, resorcinol, catechol, hydroquinone, alkyl glucosides such as methyl glucoside, 4,4'-dihydroxybenzophenone, mono-, di-, and polysaccharides, such as glucose, sucrose, lactose and starch, etc.

For convenience, the halogen-containing polyester polyols may be two types, i.e., esters of monobasic acids and polybasic acids with the above-mentioned polyhydric alcohols. Long chain fatty acids, eight to 22 carbons, are preferred when making the first class of polyester polyols. Quite often, an unsaturated fatty acid is utilized so that halogen may be easily incorporated into the molecule across the double bonds. However, saturated fatty acids may be esterified with unsaturated polyols and subsequently halogenated. Further, one can use hydroxycontaining or hydroxy and halogen-containing acids for esterification. An example would be 9,10,-chloro hydroxy stearic acid.

A very convenient polyester polyol is castor oil which may be brominated to give the halogen-containing polyester polyol. Of course, the polyester polyol may contain the halogen on the alcohol portion, i.e., the ester of 2,2 bis(bromomethyl) 1,3-propanediol and 9,10-dihydroxy stearic acid. Still further, the halogen may be on both sides of the ester function. This results when castor oil, for example, is transesterified with 2,2 bis(bromomethyl) 1,3-propanediol and the resulting esters halogenated.

The second group of polyester polyols comprises ester of the above-mentioned polyhydric alcohols and polybasic acids. Such acids include Oxalic acid, Malonic acid, Succinic acid, Glutaric acid, Adipic acid, Pimelic acid, Suberic acid, Azelaic acid, Sebacic acid, Dimer acid (a 36 carbon atom dibasic acid available from Emery Industries, Inc.) as well as tribasic acids. Specific suitable halogen-containing polyester polyols are made by the condensation of the above-mentioned dibasic acids and 2,2-bis(bromomethyl) 1,3-propanediol.

The halogen-containing polyether polyols are formed by homopolymerization of haloepoxides, copolymerization of haloepoxides and alkylene oxides, and etherification of polyhydric alcohols with alkylene oxides or haloepoxides. Halogen containing polyhydric alcohols can be used when the etherifying oxide is an alkylene oxide. An example is the reaction of 4 or 5 moles of propylene oxide per mole of 2,2-bis(bromomethyl) 1,3-propanediol.

In general, the halogen-containing polyester polyether polyols that are subsequently phosphonated in accordance with the teachings of this invention are hydroxy and halogen-containing ether adducts derived from the reaction of hydroxy higher fatty acid esters of low molecular weight polyols with haloepoxides.

The hydroxyl and halogen-containing ether adducts used in this invention are products obtained by reacting an aliphatic haloepoxide with a particular polyhydric alcohol and in this case with a "polyol polyester" to produce polyester polyethers containing chemically combined hydroxyl and halogen in the polyether unit of the molecule. The reaction is carried out at temperatures between about 30°C. and 150°C. in the presence of an acidic catalyst, usually of the Lewis acid type. Typical catalysts are $BF_3$, $SnCl_4$, $ZnCl_4$, $AlCl_3$, $TiCl_4$, etc., used in amounts of about .01 to about 3 percent based on the total weight of the reactants. The reaction time to prepare the adduct will vary depending upon the temperature of the reaction, the reactants employed, the amounts thereof, the use of a solvent, and the type of solvent. Generally, however, a reaction time in the range of between about 30 minutes and 100 hours is utilized.

The "polyol polyester" reactant which is reacted with the haloepoxide can be saturated or unsaturated and is a higher fatty acid ester (that may also contain a hydroxyl group) of a polyhydric alcohol wherein the alcohol portion contains about two to six carbons and about two to six hydroxyl groups. The term "higher fatty acids" as used herein refers to fatty acids either saturated or unsaturated, straight or branched chain of about eight to about 30 carbon atoms (10 to 22 carbon atoms preferred) which may contain one or more hydroxyl groups per acyl radical of the ester molecule. Castor oil is an example of a naturally occurring unsaturated "polyol polyester" while the ethylene glycol ester of ricinoleic acid is an example of a synthetic unsaturated "polyol ester." Saturated "polyol ester" reactants are typified by the 9-hydroxy stearic acid ester of pentaerythritol.

Suitable low molecular weight polyhydric alcohols that comprise the "polyol ester" reactant are selected from the glycols, triols, tetraols, pentols and hexols and are represented by ethylene glycol, glycerol, pentaerythritol, sorbitol, etc. Since these low molecular weight polyhydric alcohols are multi-functional, it is possible that the hydroxyl function be present on only some or even on none of the acyl radicals making up the polyol ester reactant.

The aliphatic haloepoxides that can be reacted with the "polyol polyester" reactant to form the hydroxy and halogen-containing ether derivatives of the hydroxy fatty acid esters are those saturated or unsaturated aliphatic $C_3$–$C_{10}$ straight or branched chain haloepoxides. The halogen constituent on the epoxide is preferably a chlorine or bromine atom but iodine and fluorine are contemplated. Examples of preferred reactants are epichlorohydrin and epibromohydrin. Representative aliphatic haloepoxides include: 3-chloro-1,2-epoxybutane; 3-bromo-1,2-epoxybutane; 1-chloro-2,3-epoxybutane, 1-bromo-2,3-epoxybutane; 1-chloro-3,4-epoxy-1-butene; 1-bromo-3,4-epoxy-1-butene; 3,4-dichloro-1,2-epoxybutane; 3,4-dibromo-1,2-epoxybutane; 1,4-dichloro-2,3-epoxybutane; 1,4-dibromo-2,3-epoxybutane; chloroisobutylene oxide; bromoisobutylene oxide; 1-chloro-2,3-epoxypentane; 1-bromo-2,3-epoxypentane; 4-chloro-2,3-epoxypentane; 4-bromo-2,3-epoxypentane; 3-chloro-1,2-epoxypentane; 3-bromo-1,2-epoxypentane; 1,4-dichloro-2,3-epoxypentane; 1,4-dibromo-2,3-epoxypentane; 1-chloro-2,3-epoxyhexane; 1-bromo-2,3-epoxyhexane; 1,4-dichloro-2,3-epoxyhexane; 1,4-dibromo-2,3-epoxyhexane; 2-chloro-3,4-epoxyhexane; 2-bromo-3,4-epoxyhexane; 2,5-dichloro-3,4-epoxyhexane; 2,5-dibromo-3,4-epoxyhexane; 4-chloro-2,3-epoxyhexane; 4-bromo-2,3-epoxyhexane.

As is well known to those skilled in the art, the polyols are the major building blocks of the urethane foams and are generally the ingredient upon which the behavior and properties of the foam depend. The chemical characteristics of the polyols necessary to achieve a foam with the right physical characteristics have been defined quite carefully. An ideal polyol for producing flexible urethane foam has a hydroxyl value of approximately 56 and a molecular weight of approximately 3,000. With these values in mind, it is possible by using the instant invention to design a compound having the desirable characteristics and yet contain a large amount of flame-retardant elements. For example, epibromohydrin can be reacted with castor oil in the presence of $BF_3$ as a catalyst. This product basically is a triglyceride which has had its glyceride chains lengthened first by reacting epoxide groups with hydroxyls of the ricinoleic acyl radical, then by subsequent polymerization of epibromohydrin onto the new hydroxyl groups. The molecular weight can be controlled simply by the amount of epibromohydrin added to the product. This material when subsequently phosphonated produces an outstanding flame-retardant polyol for the urethane foams. Further, the amount of phorphorus incorporated into the molecule can be varied depending upon the amount of trialkylphosphite used. Therefore one can nearly "tailor make" the molecule to whatever halogen-phosphorus ratio is desired.

Even finer control of the amount of halogen incorporated into the molecule can be had by reacting the adduct of epihalohydrin and a polyol containing an unsaturated group with molecular halogen. If it is desired to increase the halogen content with a minimum increase in molecular weight of the product, this is a good way. Each addition of an epihalohydrin increases not only the halogen content but also the carbon, hydrogen and oxygen content of the molecule. Halogenation after the epihalohydrin has reacted will increase the halogen content directly. This also allows for halogenation of materials that are inherently unstable if halogenated directly before reaction with the epihalohydrin as is the case with castor oil. The subsequent phosphonation reaction goes smoothly and the product is a light colored oil that is stable, high in halogen, contains carbon bound phosphorus with all the advantages that entails and makes good urethane foam products when reacted with an isocyanate. In this case also great variation of halogen-phosphorus ratios are possible by varying the amount of a dialiphatic acid phosphite used in the system.

The products of this invention as illustrated in the examples contain both bromine and phosphorus and thus find utility as flame retardants, particularly in urethane systems. They can be used in foam systems and also in potting-type compounds of plastisols. They may also find utility as part of the polyol in urethane floor coatings and paints.

In addition to urethane foam systems of either the rigid, semi-flexible or flexible type, these compositions can also be used for the potting-compound type of urethane, in order, for example, to embed electrical components. They may also be used as textile finishes or for fabric interliners as well as in elastomeric applications, adhesives, or spun fibers.

The method of this invention can be used to produce four classes of compounds, three of which are novel. The four classes comprise:

FORMULA I

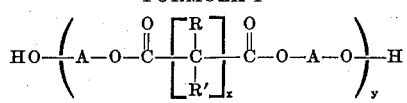

Wherein R and R' can be the same or different and can be hydrogen, halogen,

or an alkyl, alkenyl, alkynyl, or aryl group, R'' is an aliphatic group of one to 20 carbon atoms or an aryl group of six to 20 carbons, A is a polyol of from two to 10 carbon atoms that may be substituted with halogen,

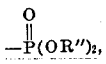

or substituted or unsubstituted alkyl, alkyenyl, alkynyl, or aryl groups of one to eight carbon atoms, at least one halogen and one

group must be on either the A group or on one of the R and R' groups, $x$ is an integer of from 1 to 40 and $y$ is an integer of from 1 to 500.

FORMULA II

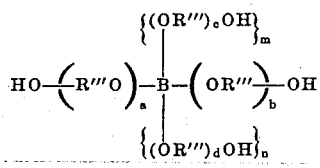

Wherein B is an alkyl or substituted alkyl group of two to eight carbon atoms with a functionality of up to 6; the alkyl group may be substituted with halogen and/or

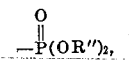

R''' is an alkyl group of one to six carbon atoms that may contain halogen and/or

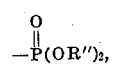

$a$, $b$, $c$ and $d$ are integers of one to about 120 and $m$ and $n$ are integers of 0 to about 120. The molecule must contain at least one halogen and one

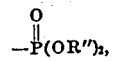

group.

FORMULA III

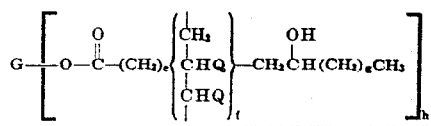

FORMULA IV

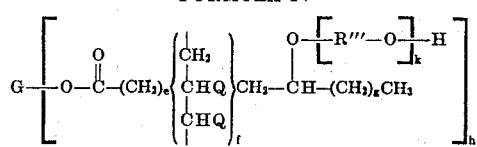

Wherein Formulas III and IV G is a hydrocarbon of less than about eight carbon atoms which may contain non-interfering hydroxyl or halogen atoms and has a functionality of up to 6; Q is halogen,

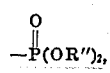

or hydrogen; $h$ is an integer of from 1 to 6; $e$ is an integer of about 0–7; $f$ is an integer of about 1–5; $g$ is an integer of from about 0–5; at least one Q in the molecule is a

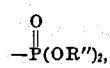

radical and the adjacent Q is either halogen or a

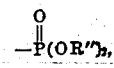

$k$ is an integer of about 1–50 and R'' and R''' are defined above.

Concerning Formula I, one sub-group of preferred compounds are those where the halogen is bromine or chlorine and the R'' group is an alkyl group of from one to four carbon atoms. Another sub-group of Formula I is those compounds wherein the A group is derived from 3,4-dibromo-2-butene-1,4-diol; 3,4-dibromobutane-1,4-diol and 2,2-bis (bromomethyl) propane-1,3 diol. Still another preferred group is Formula I wherein the dibasic acid group is derived from a member selected from the group consisting of adipic acid, azelaic acid, sebacic acid, suberic acid, glutaric acid, succinic acid, and dimer acid.

Concerning Formula II a preferred sub-group is those compositions wherein the halogen is bromine or chlorine and R''' group is an alkyl group of from one to four carbon atoms. Another preferred group is those compositions wherein B is derived from 3,4-dibromo-2-butene -1,4-diol; 3,4-dibromobutane-1,4-diol; and 2,2-bis(bromomethyl) propane-1,3 diol. Still another preferred sub-group is those compositions wherein R''' is derived from epibromohydrin, epichlorohydrin, ethylene oxide, propylene oxide, butylene oxide or mixtures thereof.

Concerning Formula III, a preferred sub-group is those compositions wherein $h$ is 3 and G is a three carbon atom hydrocarbon having a functionality of 3. Also preferred are compositions wherein h is 1 and G is a 1–6 atom hydrocarbon having a functionality of one and 1–5 hydroxyl groups. Still another preferred group is Formula III wherein one Q is a

radical, the adjacent Q is a halogen radical and all the other Q's are hydrogen or

radicals. Formula III wherein $h$ is 3, G is a 3 carbon hydrocarbon having a functionality of 3, at least one Q is a

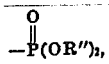

radical and the adjacent Q is either a

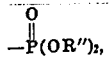

radical or halogen atom and R'' is a hydrocarbon radical of less than eight carbon atoms is also desirable. Another preferred sub-group of Formula III is those compositions wherein h is 3, G is a 3 carbon hydrocarbon having a functionality of 3 such that the composition is a bromine and phosphonate substituted castor oil.

The following examples are set forth as illustrated embodiments in the invention and are not to be taken in any manner as limiting the scope of the invention.

EXAMPLE I 76 grams of diethyl acid phosphite was dissolved in 200 ml. (175 g.) of tetrahydrofuran in a 3-neck, 500 ml. round bottom flask equipped with a motor-driven stirrer, thermometer and reflux condenser. The solution was then heated to reflux with rapid stirring and 11.5 grams of metallic sodium was slowly and carefully added. Hydrogen is generated as a by-product and is vented through the reflux condenser. After all the sodium has been added and reacted, the product is a hazy solution. It is allowed to cool under an atmosphere of nitrogen. The final product is a solution of the sodium salt of diethyl acid phosphite wherein each gram of solution contains about 0.27 grams of salt.

EXAMPLE II

Dimethyl acid phosphite (60 g.) was substituted for the diethyl phosphite in Example I and the reaction done in the same way. The product is the sodium salt of dimethyl acid phosphite.

EXAMPLE III

Into a 500 ml. 3-neck flask equipped with a motor-driven stirrer, a thermometer, and a reflux condenser, was weighed 115 g. of didodecyl phosphite and 175 ml. of dioxane was added as solvent. The solution was heated to reflux and, with rapid stirring, 11.5 g. of metallic sodium was slowly added. The by-product of hydrogen was vented through the reflux condenser. After all the sodium had been added, the solution was refluxed for an additional hour resulting in a clear solution. The product is cooled and stored under an atmosphere of nitrogen.

EXAMPLE IV

Brominated castor oil (200 g.) was dissolved in 125 ml. of tetrahydrofuran in a 1-liter, 3-neck flask equipped with a motor-driven stirrer, thermometer and reflux condenser. The sodium salt of diethyl acid phosphite synthesized in Example I (85.4 grams of the solution contained about 26 grams of salt) was then added to the rapidly stirring brominated castor oil solution held at room temperature. There was an immediate exothermic reaction raising the temperature of the reaction mass about 12°C. An immediate precipitate formed. The reaction was continued for 2 to 3 hours, then the product was poured into centrifuge bottles and centrifuged in order to remove the precipitate. Part of the solvent was removed by evaporation and to reduce pressure and the product was recentrifuged. The supernatent of the second centrifuge was put through a fallen film molecular still at 70°C. and 0.5 mmHg. to remove the last of the solvent and any volatile impurities. The final product was a clear, viscous, straw-colored oil. It analyzed 26.7% bromine, 1.8% phosphorus and a hydroxyl value of 76 and an acid value of 0.6. This product can be used in place of part or all of the polyol in urethane formulations or it can be made into a prepolymer by reacting it by means well known to those skilled in the art with a diisocyanate such as 2,4-toluene diisocyanate, xylene-1,3 diisocyanate, polymethylene polyphenylisocyanate, etc., before final incorporation into a urethane system. These prepolymers tend to make the product more stable and therefore prolong its storage life and handling ability.

EXAMPLE V

Into a 500 ml. 3-neck round bottom flask equipped as in Example III above was dissolved 100 grams of a brominated polyester polyol which was the condensation of adipic acid and 2,2-bis(bromomethyl) 1,3-propanediol (Dow Chemical Company NC-1957.1) and 125 ml. tetrahydrofuran. The sodium salt of diethyl acid phosphite (62.4 grams of solution equivalent to 19 grams of salt) as prepared in Example I was added and the reaction mixture stirred rapidly. There was an immediate exothermic reaction and a precipitate began to form. The reaction mixture was heated to reflux and maintained for several hours. The reaction mixture was then cooled and the precipitate filtered under the reduced pressure with a Buchner filter. It was very difficult to filter and the precipitate clogged the filter paper. The filtrate was collected and the solvent removed by passing the filtrate through a falling film molecular still at 60°C. at 0.5 mmHg. The resulting product was a light amber, viscous oil, the analysis showed 38.1% bromine and 3.0% phosphorus. The hydroxyl value was 78.4 and the acid value .06.

EXAMPLE VI

The polyether polyol product of 2,2-bis(bromomethyl) 1,3-propanediol and propylene oxide (Dow Chemical Company NC-1959.2) was further reacted with epibromohydrin using boron trifluoride etherate as catalyst. The resulting high bromine content polyether was water washed to remove all traces of catalyst and was distilled using a falling film molecular still. The product was then dissolved in dioxane and the dioxane solution of didodecyl phosphite sodium salt prepared in Example III was added. There was an immediate exotherm and a white precipitate formed. After several hours of heating the reaction at about 70°C. the mixture was cooled and the precipitate removed by centrifugation. The solvent was removed by passing the product through a falling film molecular still at 60°C. and 0.5 mmHg. The resulting phosphorus containing polyether was a light amber, viscous oil that contained about 2.5% phosphorus and about 34% bromine.

EXAMPLE VII

One mole of castor oil was condensed with 21 moles of epibromohydrin using boron trifluoride etherate as catalyst. The resulting polyester polyether polyol was water washed to remove all traces of catalyst and the product was distilled through a falling film molecular still at a temperature of 120°C. and a pressure of 0.5 mmHg. The product was then dissolved in tetrahydrofuran and the sodium salt of diethylphosphite in tetrahydrofuran as prepared in Example I was added. There was an immediate exotherm of about 10°C. and a white solid material formed. The reaction mixture was heated at reflux for about 4 hours, then cooled and the solid removed by centrifugation. Part of the solvent was removed under reduced pressure on a rotary evaporator and the remainder on a falling film molecular still at 100°C. and 0.5 mmHg. The resulting product contained about 1.2% phosphorus and about 32% bromine with a hydroxyl value of about 45.

Obviously many modifications and variations of the invention as hereinbefore set forth may be made without departing from the spirit and scope thereof, and therefore only such limitations should be imposed as are indicated in the appended claims.

I claim:

1. Flame retardant compositions containing reactive hydroxy groups wherein said flame retardant is a member selected from the group consisting of polyols represented by the formulas:

FORMULA I

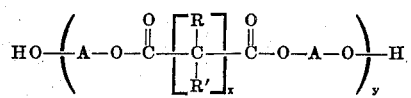

Wherein R and R' can be the same or different and can be hydrogen, halogen,

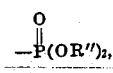

or an alkyl, alkenyl, alkynyl, or aryl group, R'' is an aliphatic group of one to 12 carbon atoms, or an aryl group of about six carbons, A is a polyol of from two to 10 carbon atoms that may be substituted with halogen,

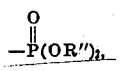

or substituted or unsubstituted alkyl, alkenyl, alkynyl, or aryl groups of one to eight carbon atoms, at least one halogen and one

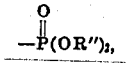

group must be on either the A group or on one of the R and R' groups, x is an integer of from 1 to 40 and y is an integer of from 1 to 500

FORMULA II

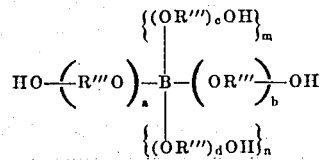

Wherein B is an alkyl or substituted alkyl group of two to eight carbon atoms with a functionality of up to 6; the alkyl group may be substituted with halogen and/or

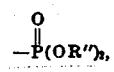

R''' is an alkyl group of one to six carbon atoms that may contain halogen and/or

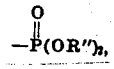

a, b, c, d are integers of one to about 120 and m and n are integers of 0 to about 120, with the condition that the molecule must contain at least one halogen and one

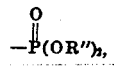

group, and

FORMULA III

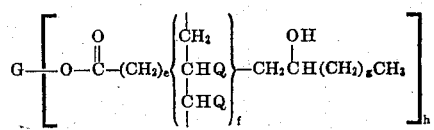

Wherein G is a hydrocarbon of less than about eight carbon atoms which may contain noninterfering hydroxyl or halogen atoms and has a functionality of up to 6; Q is halogen,

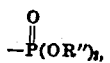

or hydrogen; h is an integer of from 1 to 6; e is an integer of about 0 – 7; f is an integer of about 1 – 5; g is an integer of from about 0 – 5; at least one Q in the molecule is a

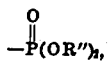

radical and the adjacent Q is either halogen or a

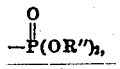

said flame retardants containing about 1 – 15 percent by weight, phosphorus and about 1 – 75 percent by weight, of halogen.

2. The composition of Formula I of claim 1 wherein the halogen is bromine or chlorine and the R'' group is an alkyl group of from one to four carbon atoms.

3. The composition of Formula I of claim 1 wherein the A group is derived from 3,4-dibromo-2-butene-1, 4-diol; 3,4-dibromobutane-1,4-diol; 2,2-bis(bromomethyl)-propane-1,3-diol.

4. The composition of Formula I of claim 1 wherein the dibasic acid group is derived from adipic, azelaic, sebacic, suberic, glutaric, succinic, and dimer acid.

5. The composition of Formula II of claim 1 wherein the halogen is bromine or chlorine and R'' group is an alkyl group of from one to four carbon atoms.

6. The composition of Formula II of claim 1 wherein B is derived from 3,4-dibromo-2-butene-1,4-diol; 3,4-dibromobutane-1,4-diol; 2,2-bis(bromomethyl) propane-1,3-diol.

7. The composition of Formula II of claim 1 wherein R''' is derived from epibromohydrin, epichlorohydrin, ethylene oxide, propylene oxide, butylene oxide or mixtures thereof.

8. The composition of Formula III of claim 1 wherein $h$ is 3 and G is a 3 carbon atom hydrocarbon having a functionality of 3.

9. The composition of Formula III of claim 1 wherein $h$ is 1 and G is a 1–6 atom hydrocarbon having a functionality of one and 1–5 hydroxyl groups.

10. The composition of Formula III of claim 1 wherein one Q is a

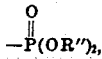

radical, the adjacent Q is a halogen and all other Q's are hydrogen or

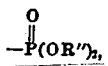

radicals.

11. The composition of Formula III of claim 1 wherein $h$ is 3, G is a 3 carbon hydrocarbon having a functionality of 3, at least one Q is a

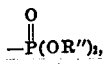

radical and the adjacent Q is either

radical or halogen atom and R'' is a hydrocarbon radical of less than eight carbon atoms.

12. The composition of Formula III of claim 1 wherein $h$ is 3, G is a 3 carbon hydrocarbon having a functionality of 3 such that the composition is a bromine and

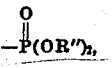

substituted castor oil.

13. A method for preparing a compound of the formula

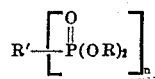

which comprises reacting R' X with MOP (OR)$_2$ at a temperature below about 120°C. wherein R is an aryl group of about six carbons or an aliphatic group of 1–12 carbon atoms, R' is a halogenated polyester polyol, polyether polyol or a polyester polyether polyol; M is an alkali metal, X is a halogen, and $n$ is an integer of one to about 50.

14. The method of claim 13 wherein R' X represents a halogen-containing glyceride.

15. The method of claim 14 wherein the glyceride is brominated castor oil.

16. The method of claim 13 wherein M is sodium; R is a saturated or unsaturated alkyl group of one to 18 carbon atoms; and R' X is a halogen-containing glyceride, ester of a dibasic acid, or a polyether.

17. The method of claim 13 wherein the temperature does not exceed 50°C.

* * * * *